United States Patent
Wilding (10) Patent No.: US 10,696,273 B2
(45) Date of Patent: Jun. 30, 2020

(54) METHOD FOR OPERATING AT LEAST ONE FUNCTION OF A MOTOR VEHICLE BY MEANS OF A PORTABLE KEY DEVICE AND KEY DEVICE

(71) Applicant: AUDI AG, Ingolstadt (DE)

(72) Inventor: Werner Wilding, Walting (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/322,684

(22) PCT Filed: Jun. 22, 2017

(86) PCT No.: PCT/EP2017/065390
§ 371 (c)(1),
(2) Date: Feb. 1, 2019

(87) PCT Pub. No.: WO2018/024401
PCT Pub. Date: Feb. 8, 2018

(65) Prior Publication Data
US 2019/0176758 A1    Jun. 13, 2019

(30) Foreign Application Priority Data
Aug. 3, 2016   (DE) .......................... 10 2016 214 369

(51) Int. Cl.
*B60R 25/24*    (2013.01)
*B60R 25/20*    (2013.01)

(52) U.S. Cl.
CPC ........ *B60R 25/241* (2013.01); *B60R 25/2018* (2013.01); *B60R 25/24* (2013.01); *B60R 2325/205* (2013.01)

(58) Field of Classification Search
None
See application file for complete search history.

(56) References Cited

U.S. PATENT DOCUMENTS

| | | | |
|---|---|---|---|
| 2010/0148923 A1* | 6/2010 | Takizawa | B60R 25/2018 340/5.82 |
| 2012/0208519 A1* | 8/2012 | Seaver | B60R 25/24 455/420 |
| 2014/0094987 A1* | 4/2014 | Healey | B60R 25/00 701/1 |
| 2014/0188310 A1 | 7/2014 | Hatfield | |
| 2015/0310684 A1* | 10/2015 | Ederle | B60R 25/24 340/5.61 |

FOREIGN PATENT DOCUMENTS

| | | |
|---|---|---|
| CN | 102700502 A | 10/2012 |
| DE | 102011011697 A1 | 12/2011 |

(Continued)

OTHER PUBLICATIONS

Office Action dated Apr. 17, 2019 in corresponding Korean Application No. 10-2019-7006307, 12 pages including English-language translation.

(Continued)

*Primary Examiner* — Thomas S McCormack
(74) *Attorney, Agent, or Firm* — Maier & Maier, PLLC (57) ABSTRACT

A method for operating a motor vehicle. A user of the motor vehicle is authorized to trigger at least one function by a portable key device. For this purpose, the key device has an identification code that uniquely identifies the key device, and an authorization data set that describes the at least one function for which the user is authorized by the key device identified by the identification code. A control device of the motor vehicle carries out the receiving of the authorization data set and the identification code from the key device. In addition, based on an identification code stored in the control device and an authorization data set stored in the control device, it is determined whether the received authorization data set and the received identification code correspond to a predetermined combination. If they correspond to the predetermined combination, an enabling of the at least one function occurs.

5 Claims, 3 Drawing Sheets

(56) References Cited

FOREIGN PATENT DOCUMENTS

| DE | 102013217723 A1 | 5/2014 |
|---|---|---|
| DE | 102012223304 A1 | 6/2014 |
| DE | 102014006048 A1 | 9/2014 |
| DE | 102015003820 A1 | 9/2015 |
| EP | 1191486 A1 | 3/2002 |

OTHER PUBLICATIONS

English Translation of International Preliminary Report on Patentability dated Feb. 7, 2019 in corresponding International Application No. PCT/EP2017/065390; 6 pages.
Examination Report dated Mar. 24, 2017 of corresponding German application No. 10 2016 214 369.7; 12 pages.
International Search Report and Written Opinion of the International Search Authority dated Oct. 9, 2017 in corresponding International application No. PCT/EP2017/065390; 16 pages including English-language Translation Attached.
International Preliminary Report on Patentability dated Aug. 15, 2018 in corresponding International application No. PCT/EP2017/065390; 30 pages.
Office Action dated Aug. 28, 2019, in corresponding Chinese Application No. 201780048248.7 including partial machine-generated English language translation; 14 gages.
German Examination Report dated Oct. 24, 2019, in corresponding German application No. 10 2016 214 369.7 including partial machine-generated English language translation; 6 pages.
Office Action dated Mar. 6, 2020, in corresponding Chinese Application No. 201780048248.7; 10 gages.

\* cited by examiner

METHOD FOR OPERATING AT LEAST ONE FUNCTION OF A MOTOR VEHICLE BY MEANS OF A PORTABLE KEY DEVICE AND KEY DEVICE

FIELD

The invention relates to a method for operating at least one function of a motor vehicle, wherein a user of the motor vehicle is authorized to carry out at least one function by means of a portable key device. The invention also relates to such a key device.

BACKGROUND

In many countries, for example, valet parking is an expected service when visiting a restaurant or hotel or a refueling or washing service. Valet parking keys provided particularly for this purpose can start the vehicle but cannot open a glove compartment, for example. In modern vehicles, there is increasingly no need for a conventional key that has to be inserted into an ignition key in order to activate the vehicle. A start button in combination with a near-field transmitter in the key takes over this function. In service work, for example, in an American car wash, the vehicle along with the key is usually turned over to an employee and picked up after the work has been done.

However, a disadvantage here is that vehicle owners turn in their vehicle and check only after getting the vehicle back whether there is something missing in their vehicle or whether the car has been driven a longer distance than the presumed distance, for example, to the parking garage. In addition, careful handling, particularly in high-performance vehicles, cannot always be unequivocally established retrospectively.

DE 10 2014 006 048 A1 describes a method for an intelligent alarm trigger in valet parking of a motor vehicle, in which, when a motor vehicle leaves a predetermined territorial range, a signal is sent by a monitoring unit to a corresponding mobile electronic unit. However, an authorization for this cannot be carried out.

DE 10 2012 223 304 A1 describes a system for the selective opening of a vehicle, with a valet function for issuing a limited user authorization for a service provider. For this purpose, two identification routines are used, in which a service provider is identified. Direct access of the third-party device to the control device of the motor vehicle occurs, which, however, may entail the risks of the transfer of malware or the use of the control device as an insecure door of entry for example.

DE 10 2011 011 697 A1 describes a closure system and a method for controlling an access authorization or driving authorization for a motor vehicle, in which an authorization for the limited use of the vehicle is transferred to a terminal.

The above-mentioned disadvantages are not or only minimally overcome.

One underlying aim of the invention is to improve the reliability of the authorization of motor vehicle use to a limited extent.

SUMMARY

The aim is achieved by the inventive method and the inventive key device and by the inventive control device and the inventive motor vehicle according to the independent claims. Advantageous developments of the invention are indicated by the dependent claims.

The invention is based on the idea of transferring, in addition to an identification code which uniquely identifies a key device, an authorization data set to a key device, wherein the motor vehicle receives the identification code and the authorization data set from the key device, and on the basis of the data received determines which function of the motor vehicle the user is authorized for. Thereby, a bidirectional key device can be provided with a programmable vehicle access. A user can thus establish rights for third parties via the key device. In contrast to conventional systems, the invention allows a double control and reduces the risk of radio-transmitted malware to a control device of the motor vehicle and thus the use of a radio system as a door of access to the unauthorized use of the motor vehicle.

A portable key device here is a device for opening a motor vehicle, which is structurally not connected to the motor vehicle. The portable key device can be carried by a user and can be designed as a key and/or a key fob, for example.

The inventive portable key device here comprises a communication unit, that is to say a component or component part, which is set up for wire or wireless communication with another device and which can be designed, for example, as a transponder unit. The communication unit is set up to receive and to store an identification code and an authorization data set and to provide a data communication connection to a communication unit of a control device of the motor vehicle. Here, the communication unit is set up to transfer the identification code and/or the authorization data set, for example, to the control device of the motor vehicle. This results in the above-mentioned advantages.

The identification code here is, for example, a numerical code which uniquely identifies the portable key device. The authorization data set here is a data set which describes at least one function which the user is authorized to use. The authorization data set can here describe, for example, an authorization protocol which can describe several such functions, for example.

The inventive method for operating the motor vehicle, wherein the user of the motor vehicle is authorized to trigger the at least one function by means of a portable key device, and wherein the key device comprises, for example stores, the identification code and the authorization data set, has the following steps carried out by the control device of the motor vehicle. The control device here is a device or a device component of the motor vehicle which is set up for receiving, generating and transferring control signals.

First, a reception of the authorization data set and of the identification code from the key device occurs. Based on an identification code stored in the control device and on an authorization data set stored in the control device, a determination occurs as to whether the received authorization data set and the received identification code correspond to a predetermined combination, that is to say to the combination of the identification code stored in the control device and the authorization data set associated with the identification code stored in the control device. In the case of correspondence to the predetermined combination, an enabling of the at least one function occurs.

By the inventive method, rights for third parties can be established. For example, the inventive key device can be designed as a so-called "valet parking key," so that for certain services such as refueling or washing of the motor vehicle for example, the user can authorize the corresponding user for an intended selection of functions of the motor vehicle. The access to the motor vehicle does not occur directly to an actuator of the motor vehicle, that is to say not directly to a control device performing the at least one function, but indirectly via the control device. In other words, this results advantageously in the operating or control devices such as, for example, an actuator, for example, a motor, not being addressed directly. The use of the key device as an insecure door of entry in order to hack the motor vehicle can thus be prevented effectively. In addition, the owner of the vehicle can keep his own motor vehicle key and thus does not have to hand it over. In addition, due to the inventive method, for the communication with the motor vehicle, the owner does not have to be in the vicinity of the motor vehicle with a master key.

According to a preferred embodiment of the inventive method, an association of the identification code with the key device can occur by a data processing device external to the motor vehicle, that is to say, for example, by an Internet server. By the data processing device external to the motor vehicle, a creation of the authorization data set and an establishment of an association of the authorization data set with the identification code and also a transfer of the authorization data set and of the identification code to the key device and to the control device can occur. This advantageously results in the owner of the motor vehicle being able to change the authorization protocols and thus the individual user rights, for example, via the Internet, for example, using a mobile terminal. The communication between the data processing device external to the motor vehicle and the control device of the motor vehicle can then occur, for example, via an Internet connection.

According to an additional, particularly preferred embodiment of the inventive method, a communication unit of the control device of the motor vehicle can perform a reception of image and/or text and/or voice information from the key device and a transfer of the received image and/or text and/or voice information to the data processing device external to the motor vehicle and/or to the mobile terminal. A communication unit is a component of a device which is designed for data communication. The communication device of the control device of the motor vehicle can be designed, for example, as a circuit of the control device. For example, the user of the key device can thus send a text message to the control device of the motor vehicle by means of the key device, which the motor vehicle can then transfer to the data processing device and/or, for example, a Smartphone of the owner. The exemplary text message can indicate, for example, that a service has been performed.

The mentioned advantages are also achieved by the inventive portable key device which can comprise an operating element for receiving an operating action of a user, and a control unit, wherein the control unit of the key device is set up to generate, depending on the received operating action, the digital image and/or text and/or voice information, wherein the communication unit of the key device can be set up for transferring the digital image and/or text and/or voice information.

Operating element here is understood to mean an element which can receive an operating action, that is to say, for example, a corresponding electronics for transferring a touch. Advantageously, the portable key device can be designed so that the operating element can comprise a touch-sensitive operating area and/or touch-sensitive screen.

If the receiving of the image and/or text and/or voice information occurs in response to a query signal sent by the communication unit of the control device of the motor vehicle to the control device, it is made possible for the owner of the motor vehicle to request, for example, a status report from the user of the key device. Thus the owner can here at any time ask, for example, whether a certain service has already been performed, where the motor vehicle is located, or request the setting up of a telephone connection with the user of the portable key device. Preferably, the query signal can come from the data processing unit external to the motor vehicle and/or from the mobile terminal, that is to say, preferably, the query signal can be generated by the data processing unit external to the motor vehicle and/or by the mobile terminal and transferred to the communication unit of the motor vehicle. Here, for example, the query signal can be transferred via an Internet connection to the control device of the motor vehicle during the transfer of the query signal to the portable key device, for example, via a WLAN or radio connection.

In other words, the owner can, for example, send the query signal directly to the communication unit of the control device or indirectly via the data processing unit to the communication unit of the control device of the motor vehicle. The communication unit of the control device of the motor vehicle can then, for example, send the query signal to the key device—and thus to the user—via a WLAN or radio connection.

The at least one function here preferably comprises opening and/or closing a motor vehicle door or multiple motor vehicle doors and/or of providing an Internet connection between the control device and the data processing device external to the motor vehicle and/or providing a predetermined motor output and/or providing a telephone connection between the control device and the data processing unit external to the motor vehicle and/or providing an emergency call function of the motor vehicle. This results in a very wide variety of combinations of individual functions to be enabled as well as in the possibility of communication between owner and user.

For example, the control device of the motor vehicle can be automated according to an additional embodiment and/or provide information upon request, which can describe an operating state of the motor vehicle and/or an operating state of a device and/or a component of a device of the motor vehicle, for example, an odometer reading, and transfers this information to the data processing unit external to the motor vehicle and/or to the mobile terminal. Thereby, the owner of the motor vehicle can check, already before picking up the motor vehicle, whether the user of the key device has driven only to the parking facility, for example, or whether he has used the car in an unauthorized manner for a longer trip. The selection of desired status information can be made, for example, by the owner, for example by establishing a status protocol.

The above-mentioned aim is also achieved by a control device of the motor vehicle, comprising a processor device which can be set up to perform the method steps of an embodiment of the inventive method, which relate to a control device. The processor device can for this purpose comprise at least one microprocessor and/or a microcontroller. Moreover, the processor device can comprise a program code which is set up to carry out, during execution by the processor device, the method steps of an embodiment of the inventive method, which relate to a control device. The program code can here be stored in a data memory of the processor device. This results in the above-mentioned advantages.

The above-described aim is also achieved by a motor vehicle which can preferably be designed as a car, in particular a passenger car. The inventive motor vehicle comprises an embodiment of the inventive control device. This results in the above-mentioned advantages.

BRIEF DESCRIPTION OF THE DRAWINGS

The invention is explained again in further detail in reference to the appended drawing using concrete embodiment examples. The embodiment examples explained below relate to preferred embodiments of the invention. In the embodiment examples, however, the described components of the embodiments in each case describe individual features of the invention to be considered independently of one another, which in each case also further develop the invention independently of one another and thus should be considered separately or in another combination than the one shown as part of the invention. Moreover, the described embodiments can also be completed by others of the features of the invention described above. Functionally equivalent elements in the figures bear identical reference numerals. The figures show.

DETAILED DESCRIPTION

Figure 1:
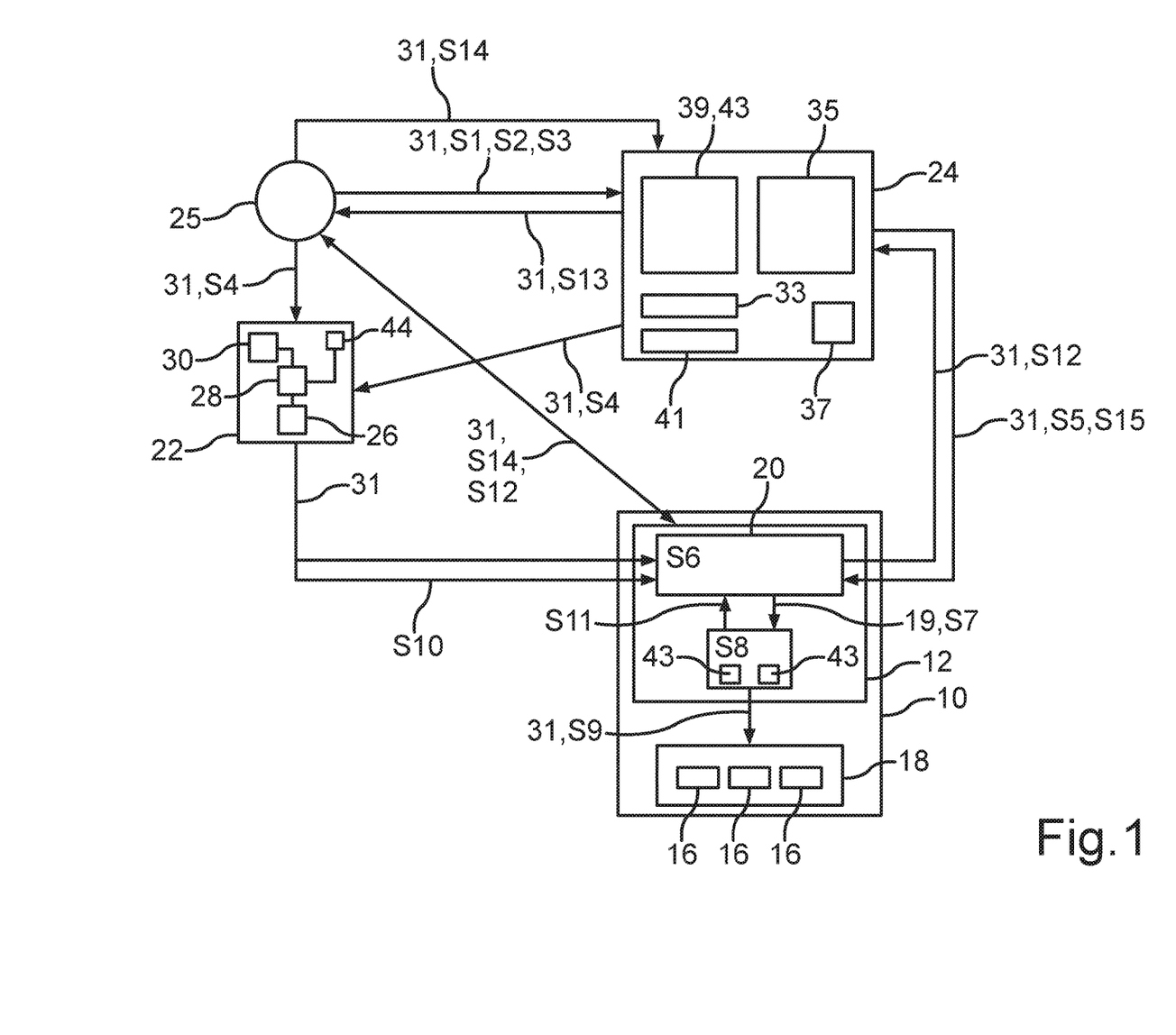
FIG. 1 a schematic drawing of an embodiment of the inventive method.

FIG. 1 diagrammatically illustrates the principle of the inventive method on the basis of a first embodiment example. For this purpose, FIG. 1 shows a motor vehicle 10 which can preferably be designed as a car, for example, as a passenger car. The motor vehicle 10 comprises a control device 12 which can be designed, for example, as a control unit. Preferably, the control device 12 here comprises a processor device 14 which can be designed, for example, as a microcontroller and/or microprocessor. The processor device 14 can here also be referred to as a so-called "main unit" or on-board electrical system control device, for example, and it can be set up inter alia in order to control a device or an actuator 16 of the motor vehicle 10, where the term "actuator" is understood to mean a device which is set up to carry out the at least one function. The actuator 16 can be designed, for example, as a controller of a motor output, a closure device for opening and/or closing a motor vehicle door, or as a communication unit for providing a telephone and/or Internet connection. In FIG. 1, the exemplary actuators 16 are here shown as part of an on-board electrical system 18 of the motor vehicle 10.

The processor device 14 can comprise, for example, a program code, that is to say, for example, a software for carrying out the inventive method. The program code can be stored in a data memory of the processor device 14 (not shown in FIG. 1).

According to the example of FIG. 1, the control device 12 can moreover comprise a communication unit 20 which can be designed, for example, as a circuit for receiving signals from the portable key device 22, signals from a data processing device 24 external to the motor vehicle and/or from a mobile terminal 25 of the user. The communication unit 20 can also be set up for sending signals to the processor device 14 and the mentioned communication partners.

The portable key device 22 can be set up, for example, as a so-called "valet parking key" and be designed, for example, as a key fob. In other words, it is not necessary for the portable key device 22 to comprise a part which mechanically engages with a closure device of the motor vehicle during the opening or closing of a motor vehicle door. In other words, no key bit is necessary. The key device 22 has a communication unit 26 for communicating with the control device 12 and an optional control unit 28 which can be designed, for example, as a circuit on a microchip of the portable key device 22, for the generation of digital image and/or text and/or voice information. The control unit 28 can be set up to generate a corresponding image and/or audio signal which is capable of describing the digital and/or text and/or voice information. Optionally, the key device 22 can comprise an operating element 30 or multiple operating elements 30.

In the example of FIG. 1, the owner of the motor vehicle 10 can have, for example, a master key for the motor vehicle 10 which authorizes him to trigger all the functions of the motor vehicle 10. For example, the owner of the motor vehicle 10 can be traveling and, for example, he wishes to have the motor vehicle 10 parked in a parking garage by a hotel service and, for example, can have instructed the hotel service to wash and clean the automobile in addition. For example, if he does not want the service personnel to clean his trunk space, because it contains luggage or documents to which no one else should have access, for example, it would be disadvantageous for him to relinquish his master key to service personnel.

In this situation, it is helpful for him to have, in addition to a master key, one or more additional key devices 22, which authorize the service personnel to trigger only certain functions. Such a key device 22 can also be referred to as a "valet parking key."

In order to establish the functions for which the service personnel is to be authorized by means of the portable key device 22, the owner of the motor vehicle 10 can use, for example, his mobile terminal 25, for example, a Smartphone or a Tablet-PC, and therewith can program the portable key device 22. The programming of the portable key device 22 here represents an optional possibility of the establishment of the authorized functions of the motor vehicle 10, which can occur alternatively also, for example, by a manufacturer of the motor vehicle 10, who, for example, can carry out the establishment of the authorized functions already in the plant.

If the owner of the motor vehicle 10 establishes the authorization, then he can communicate with the data processing device 24 external to the motor vehicle, for example, via a data communication connection 31 between the mobile terminal 25 and the data processing device 24 external to the motor vehicle, for example, via an Internet connection. The data communication device 24 external to the motor vehicle can be designed, for example, as a server of the motor vehicle manufacturer, which can comprise, for example, a data base with customer profiles. The owner of the motor vehicle 10 can log into his customer profile, for example with indication of a customer number 33, wherein the customer profile can also store, for example, an identification number 35 of the motor vehicle 10 and/or a password 37, for example, a password for the setting up of a data communication connection 31 between the motor vehicle 10 and the data processing device 24. For example, the data processing device 24 can also provide software by means of which the owner of the motor vehicle 10 can establish which key devices 22 he can authorize for which functions of the motor vehicle 10.

By means of the mobile terminal 25, the owner can, for example, establish a first authorization protocol 39 (method step S1) and optionally an identification code 41 of the portable key device 22 (S2). However, the association of the identification code 41 with the key device 22 can optionally also be already preset by the manufacturer. In addition, the owner can associate, for example, the authorization protocol 39 with the identification code 41, that is to say establish an association of the authorization protocol 39 with the identification code 41 (S3).

The authorization protocol can establish, for example, that the user of the key device 22 may open all the doors of the motor vehicle 10, use a preset valet parking mode as well as, for example, trigger an Internet and telephone connection via the motor vehicle 10. The authorization protocol 39 can be stored by the data processing device 24 as authorization data set 43.

If the owner of the motor vehicle 10 programs the authorization protocol, for example, from home, then the authorization data set 43 can be transferred, for example, via a WLAN connection, to the portable key device 22 (S4), when the owner has not yet handed over the key device 22 to the service personnel. Alternatively, the authorization data set 43 and/or the identification code 41 of the key device 22 can be transferred, for example, via an Internet connection to the key device 22 (S4). The communication unit 26 of the portable key device 22 can for this purpose be designed, for example, as a receiver for data communication, which is known to the person skilled in the art from the prior art.

The authorization data set 43 and the identification code 41 can also be transferred by the data processing device 24 to the control device 12 (S5), for example, via an Internet connection. For the operation of the motor vehicle 10, the service personnel uses the portable key device 22. For the triggering of the at least one function, the control device 12 receives, for example, by means of the communication unit 20, the authorization data set 43 and the identification code 41 from the key device 22 (S6). The communication between the key device 22 and the communication unit 20 of the motor vehicle 10 can occur, for example, via near-field communication or a Blue-tooth connection. In method step S7, the control device 12 determines whether the received authorization data set 43 and the received identification coded 41 correspond to the combination received by the data processing device 24. For this purpose, the communication unit 20 of the control device 12 can transfer, for example, the authorization data set 43 received by the key device 22 as well as the identification code 41 received by the key device 22, for example, to the processor device 14, which can carry out such a comparison for the determination of a correspondence of the combination (S8). Here, in FIG. 1, it is shown, for example, that in the processor device 14 multiple different authorization data sets 43 can be present, for example.

The authorization data sets 43 present in the processor device 14 can here, for example, each describe an activity protocol, that is to say a protocol for establishing which functions may be carried out by means of the key device 22, and/or a status protocol, that is to say a protocol which can establish which information the owner can retrieve and/or which information the owner can receive from the key device 22.

In the present example of FIG. 1, for example, there is correspondence of the combination. The control device 12 then enables, for example by means of the processor device 14, the at least one function for which the user of the key device 22 can be authorized according to the authorization data set 43 (S9). The communication can here occur via the on-board electrical system 18 represented as an example, by means of which then, for example, an opening of all the doors and the use of an Internet or telephone connection can then be enabled. Here, for example, the communication unit can be activated as an actuator 16 and/or the closure device can be activated as an actuator 16. Alternatively or additionally, it can be provided, for example, that, for example, the user can use the key device 22 can now make use of a motor output of the motor vehicle 10 or that specifically said motor output is controlled by the authorization protocol, that is to say, for example, only a certain motor output can be used.

A status can describe, for example, an odometer reading or a charging state of a motor vehicle battery. Alternatively or additionally, a status can also describe a status of the services to be performed. A signal can then be transferred by the key device 22 to the communication unit 20 of the motor vehicle 10, which can transfer the status "vehicle washing completed" or "vehicle parked" (S10). Such a status report can, for example, occur in response to an operating action of the user, wherefore the user can also actuate, for example, the operating element 30, for example, a button. Alternatively or additionally, the communication unit 20 of the control device 12 can receive, for example, a voice message (S10) which can be recorded and transferred, for example, by means of a microphone 44 of the key device 22. If the status describes, for example, an odometer reading or another status of an actuator 16 or of a control device of the motor vehicle 10, then this status can be transferred, for example, by the processor device 14 via, for example, a data bus of the motor vehicle 10 to the communication unit 20 (S11).

The communication unit 20 of the motor vehicle 10 can then set up a data communication connection 31 with the data server external to the motor vehicle 10 and transfer the status information or the exemplary voice information, for example, after identification of the motor vehicle 10 via the identification number 37 of the motor vehicle (S12). In other words, the motor vehicle 10, for example, by means of a so-called "pin," can log into in the data processing device 24 external to the motor vehicle and transfer the status message. The data processing device 24 external to the motor vehicle can then transfer, for example, via an Internet and/or telephone connection, the exemplary odometer reading or the exemplary voice message to the mobile terminal 25 of the owner (S13).

Such a status query can optionally also be carried out actively by the owner. For this purpose, the owner can transfer, using the mobile terminal 25, for example, a query signal to the data processing device 24 (S14), wherein the data processing device 24 can then transfer the query signal to the control device 12 (S15). The status query (S14) can also be carried out directly by the mobile terminal 25 and by the control device 12 or the communication unit 20 of the motor vehicle 10. The status report accordingly can also be transferred by the control device 12 directly to the mobile terminal 25 (S12).

Figure 2:
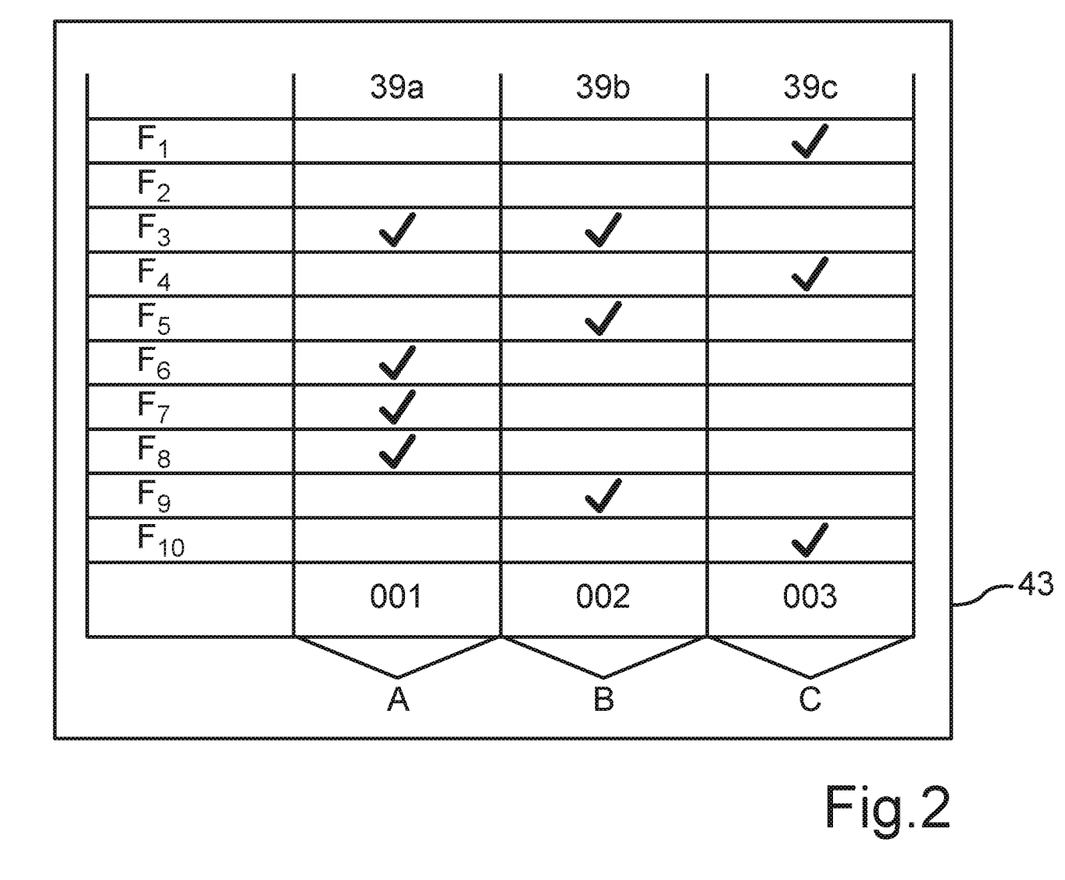
FIG. 2 a schematic drawing of an additional embodiment according to the invention.

FIG. 2 diagrammatically shows an example of an authorization protocol 39 which can be described by the authorization data set 43. As represented in FIG. 2, this authorization protocol 39 can be displayed, for example, on a display or on another user surface of the mobile terminal 25. For example, the user 3 can program different authorization protocols 39a, 39b, 39c. A respective identification code 001, 002, 003 for a respective key device 22 can then be associated with each of the authorization protocols 39a, 39b, 39c. Different functions $F_1$ to $F_{10}$ are listed here line by line.

In a first authorization protocol 39a, it can be established (S3), for example, that a user of the key device with the identification code 001 can use, for example, a function for opening all the doors ($F_3$), a valet parking mode ($F_6$), in which a combination of the function for the starting of the motor vehicle and for the enabling of an operating element 30 or multiple operating elements 30 of the key device 22 can be provided with the identification code 001, as well as the functions for providing an Internet and telephone connection ($F_7$, $F_8$). The execution protocol 39b can enable, for example, the triggering of the functions $F_3$, $F_5$ (for example, activating a so-called "motor map" which can describe certain motor functions) and $F_9$ (for example, providing a telephone connection of a certain telephone number, for example, the mobile number of the mobile terminal 25 of the owner). The third exemplary execution protocol 39c can enable, for example, the opening of a first motor vehicle door ($F_1$), a second motor map ($F_4$), and the use of an emergency call function ($F_{10}$). In the example of FIG. 2, other optional functions, for example the opening of another motor vehicle door or of the trunk lid ($F_2$), can be provided for none of the key devices 22.

For the establishment of the association of the authorization data set 43 with the identification code 41 (S3), the user can, for example, move with a mouse over the exemplary user surface and, for example, place a check mark by clicking on a corresponding field, and thus enable the corresponding function for a corresponding key device 22.

In other words, FIG. 2 shows the filing of key profiles by the user. Alternative or additional optional functions $F_1$ to $F_{10}$ can describe, for example, an authorized motor output, for example, only 300 hp instead of the possible 600 hp, or for example, only 80 percent of the output, or, for example, the enabling of an emergency call function instead of a telephone or Internet connection. The exemplary control of the motor output which can be enabled for the user of the key device 22 can be programmed, for example, for a key device 22 which the owner of the motor vehicle 10 can give to his children, for example.

Figure 3:
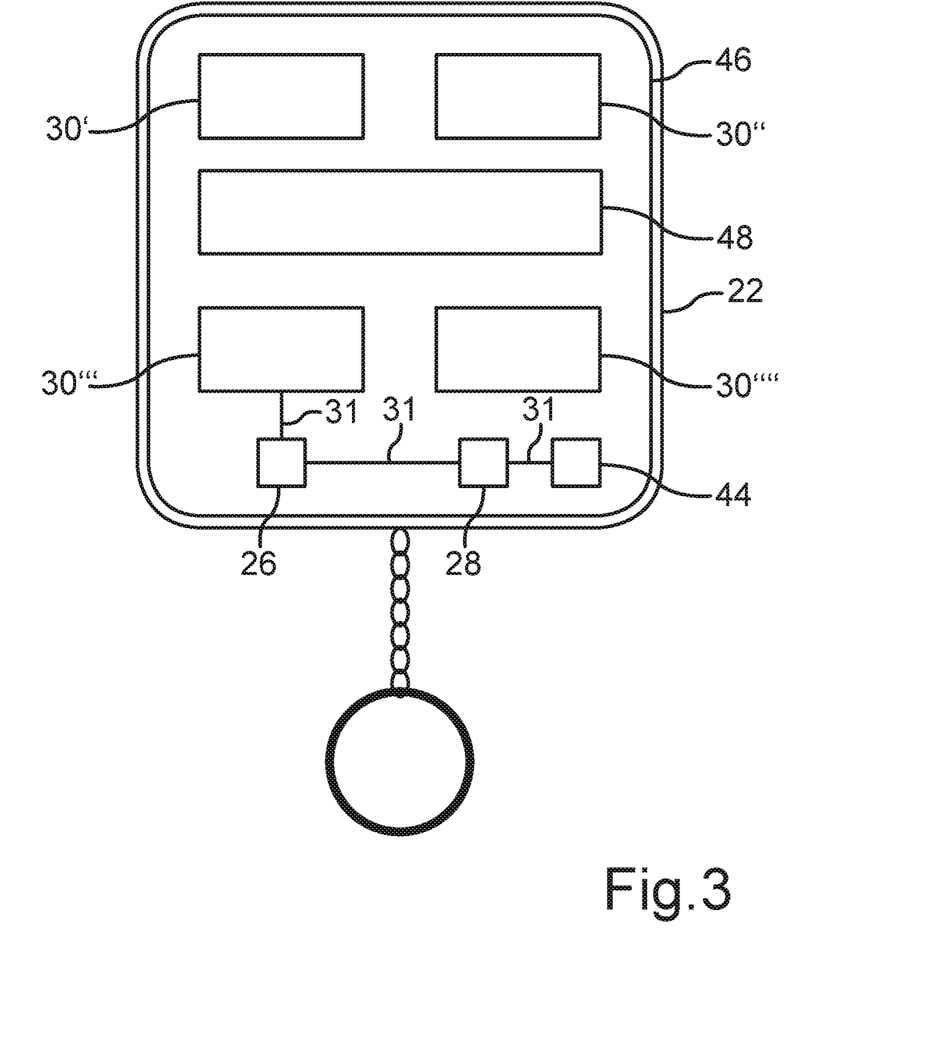
FIG. 3 a diagrammatic step of an embodiment of an inventive portable key device.

FIG. 3 shows, as an example, an embodiment example of a key device 22 which can be designed, for example, as a key fob with a chain and a ring (without reference numeral in FIG. 3). The key device 22 can comprise several operating elements 30 which can be designed, for example, as a button or as an operating field of the touch-sensitive screen 46. In the example of FIG. 3, the touch-sensitive screen 46 shows an optional logo 48 of the motor vehicle manufacturer.

Here, for example, each operating element 30 can be associated with a certain function, so that, for example, touching the operating element 30' by the exemplary service personnel generates a voice or text message which can be transferred to the control device 12 (S10), message saying, for example, that the motor vehicle is ready, that is to say that the service has been performed. An operating of the exemplary operating element 30" can generate and transfer, for example, a message (S10) which says that the motor vehicle has been opened or closed. An operating element 30'" can provide, for example, that a telephone connection or an Internet connection with the owner of the motor vehicle, that is to say with the exemplary mobile terminal 25 of the owner, can be provided. Such a telephone or Internet connection can be provided, for example, by means of the control device 12. The operating element 30"" can provide, for example, that, when it is operated, an emergency call function can be activated. The operating elements 30', 30", 30'", 30"" can, for example, display a text which can describe the associated function. For example, if the person of the service personnel has an accident while driving in the parking garage, then, for example, an emergency call can be placed rapidly and automatically by operation of the operating element 30"" or the owner can be informed by means of the operating element 30'".

Optionally, the key device 22 can comprise, for example, a microphone 44 which the user can then use, for example, for calling the motor vehicle owner on the telephone. Alternatively or additionally, it can be provided that the control unit 28 of the key device 22 is connected with the microphone 44 and can execute voice recognition of the voice signal recorded by the microphone 44. The control unit 28 can then generate, for example, a corresponding digital message, for example, a text message, and transfer it by means of the communication unit 26 to the motor vehicle 10 and/or to the data processing device 24 and/or to the mobile terminal 25. In addition, it should be mentioned here that the transfer of a signal capable of describing the operating action received can also transfer, for example, by means of the communication unit 26, for example, to the control device 12. For the sake of simplicity of representation, a corresponding data communication connection 31 is shown only between the operating element 30'" and the communication unit 26. The communication between the communication unit 26 and the other operating elements 30', 30", 30"" can occur in the same manner.

According to an additional embodiment example, the key device 22 and/or the operating element 30 can comprise, for example, a touch-sensitive screen 46 and/or a touch-sensitive operating area which can be set up to recognize a finger movement on the operating element 30 and recognize on the basis of the finger movement, for example, a word or a letter which the owner has drawn with his finger on the operating element 30. In the case of such an input recognition, on the basis of the recognized letter or of the recognized word, it can be determined, for example, that the user has, for example, written the word "okay" on the operating element 30 and transferred a corresponding preset text message to the control device 12.

The above-described embodiment examples describe the principle of the invention, of transferring by means of the key device 22 predetermined activation steps to the motor vehicle 10. Thereby, a bidirectional key device 22, for example, a valet parking key, is provided with programmable vehicle access. Advantageously, the possibility is offered thereby for the owner of the motor vehicle 10 to monitor, for example, a parking process or a refueling, washing or charging process, for example, a current status of the service work before the return of the vehicle. In the case of electrical charging of the vehicle batteries, their charging state can be transferred, for example, using an application program ("app") via the motor vehicle 10 to the mobile terminal 25.

Depending on vehicle 10, the key device 22 can allow different functions to be performed, which go considerably beyond usual functions of a radio key from the prior art. According to an embodiment example, the owner can set or have set, for example, via software or by the car dealer, which authorizations are available to the user of the key device 22 when activating the motor vehicle 10. An access limitation can be, for example, the opening of only the driver-side door, the opening of all the doors optionally without the trunk, and so forth. For example, an active Internet use for third parties can be blocked; optionally, it may be possible only to send to a mobile terminal 25 of the owner, for example, a Smartphone, or actions selected by the owner can be enabled, for example, only telephoning.

For example, for the motor vehicle 10 in a "valet parking mode," a motor output may be enabled only to a limited extent.

The inventive method and the inventive key device 22 can moreover enable, for example, a status display and/or a request for service work. For example, if services such as refueling, washing, cleaning and so on are used, the portable key device 22 which can be designed, for example, as a valet parking key, can be handed over, instead of the actual key, that is to say instead of the master key of the owner. Located on the key device 22 is a communication unit which can also be referred to as transponder unit, based on "Bluetooth" or "Near Field Communication" (NFC), for example. A respective signal can be transferred by the key device 22 to the motor vehicle 10 and from there, for example, via a vehicle-internal interface, to the mobile terminal 25 of the vehicle owner. Here, a simple signal can be, for example: "vehicle washing completed," "cleaned" and so on. Additional possibilities would be, for example, an emergency signal which can be triggered by service personnel by means of the key device 22 and sent from the motor vehicle 10 to the mobile terminal 25 of the owner. For example, this can be possible in the case of an emergency (injury, accident, or need for further queries, and so on), for example.

In other words, the owner establishes rights for third parties via the key device 22. In addition, with this key device 22, a calling function can be connected, for example, which can signal to the user that service work on his motor vehicle 10 has been completed. Advantageously, it is also possible to implement limited access to the motor vehicle 10 and limited access to the vehicle communication/Internet or, for example, a restricted motor output, to the extent that the motor vehicle 10 meets the physical prerequisites. Before the return of the key device 22 to the owner, the key device 22 can transfer the desired data via the vehicle communication to the owner, before said owner can accept the return of the motor vehicle 10 (for example, distance traveled, full throttle ratio, telephone activity, etc.).

According to an additional embodiment example, the key device 22 represents an extension of the so-called "kessy system," that is to say a radio key system, wherein the inventive extension in the form of an additional data transfer, for example, a near-field data transfer, transfers preset activation steps to the motor vehicle 10. The service personnel can only use the enabled functions. For example, by accessing an established calling channel in the vehicle communication (for example, via Bluetooth), it is possible, for example, to transfer vehicle information established beforehand by the vehicle owner automatically to the owner as soon as the motor vehicle 10 is started again.

Depending on the technical design or form of the key device 22, it is possible, for example, via defined switches, touch fields or, for example, as a voice message, to transfer short communications to the driver (for example, "vehicle washing and refueling completed—please pick up"). This function can also be transferred by the key device 22 to the motor vehicle 10 and via the vehicle communication to the mobile terminal 25 (for example, Smartphone, Smartwatch or Tablet).

For example, the motor vehicle manufacturer can offer a software framework making is possible for the owner to enable certain functions $F_1$ to $F_{10}$, depending on the vehicle design, via the key device 22. The programmed and coded data set 43 can at the same time be transferred to the key device 22 and to the motor vehicle 10 (S4, S5).

The motor vehicle 10 thus has an existing "plan of action" for the corresponding key code. In another design, the owner himself can carry out certain enabling operations, for example based on a menu, in yet another design the settings can be made, for example, by the motor vehicle manufacturer or by the authorized repair shop.

The invention claimed is:

1. A method for operating a motor vehicle, wherein a user of the motor vehicle is authorized to trigger at least one function by a portable key device, and wherein the key device has an identification code that uniquely identifies the key device, and an authorization data set that describes the at least one authorized function, and the authorization data set is associated with the identification code, wherein for the at least one authorized function, the user is authorized by means of the key device identified by the identification code, comprising the steps carried out by the control device of the motor vehicle:

receiving of the authorization data set and the identification code from the key device;

based on an identification code of the key device, which is stored in the control device and an authorization data set stored in the control device, which is associated with the identification code, determination as to whether the received authorization data set and the received identification code correspond to a predetermined combination; and, if the received authorization data set and the received identification code correspond to the predetermined combination, enabling of the at least one authorized function so that the identified key device triggers the at least one authorized function of the motor vehicle, and the method for operating the motor vehicle further comprising steps carried out by a data processing device external to the motor vehicle:

association of the identification code with the key device;

preparation of the authorization data set and establishment of an association of the authorization data set with the identification code; and transfer of the authorization data set, of the identification code and of the established association between the authorization data set and the identification code to the key device and to the control device, wherein a mobile terminal communicates with the data processing device, and the preparation of the authorization data set and the establishment of the association of the authorization data set with the identification code are instructed by the mobile terminal via at least one authorization protocol, and wherein each of the authorization data privileges a different function set, and each privilege of the different function set is associated with each of the identification code, and the method for operating a motor vehicle further comprising the steps carried out by a communication unit of the control device:

providing information that an operating state of the motor vehicle and/or of a device of the motor vehicle; and transfer of the information to the data processing device external to the motor vehicle and/or to the mobile terminal.

2. The method according to claim 1, further comprising the steps carried out by a communication unit of the control device:

receiving of image and/or text and/or voice information from the key device, and transfer of the received image and/or text and/or voice information to the data processing unit external to the motor vehicle and/or to the mobile terminal.

3. The method according to claim 2, wherein the receiving of the image and/or text and/or voice information occurs in response to a query signal sent by the communication unit of the control device of the motor vehicle to the key device, wherein the query signal comes from the data processing unit external to the motor vehicle and/or from the mobile terminal.

4. The method according to claim 1, wherein the at least one function includes opening and/or closing a motor vehicle door and/or providing an Internet connection between the control device and the data processing device external to the motor vehicle and/or providing a predetermined motor power and/or providing a telephone connection between the control device and the data processing device external to the motor vehicle and/or providing an emergency call function of the motor vehicle.

5. A portable key device comprising a communication unit configured to perform the steps of:
 receiving and storing an identification code and an authorization data set,
 providing a data communication connection to a communication unit of a control device of the motor vehicle, wherein the communication unit of the key device is set up to transfer the identification code and/or the authorization data set,
 an operating element for receiving an operating action of a user, wherein the operating element comprises a touch-sensitive operating area and/or a touch-sensitive screen, and
 a control unit which is set up to generate, depending on the received operating action, digital image and/or text and/or voice information, wherein the communication unit is set up to transfer the digital image and/or text and/or voice information,
 wherein the portable key device is identified by the identification code, the authorization data set that describes the at least one authorized function, and the authorization data set is associated with the identification code so that the identified portable key device triggers the at least one authorized function of the motor vehicle,
 wherein the identification code and the portable key device are associated by a data processing device external to the motor vehicle,
 wherein the data processing device prepares the authorization data set and establishment of an association of the authorization data set with the identification code,
 wherein the data processing device transfers the authorization data set, the identification code and the established association between the authorization data set and the identification code to the portable key device and to the control device of the motor vehicle,
 wherein a mobile terminal communicates with the data processing device, and the preparation of the authorization data set and the establishment of the association of the authorization data set with the identification code are instructed by the mobile terminal via at least one authorization protocol,
 wherein each of the authorization data privileges a different function set, and each privilege of the different function set is associated with each of the identification code,
 wherein the control device of the motor vehicle includes a communication unit, the communication unit provides information that an operating state of the motor vehicle and/or of a device of the motor vehicle,
 wherein the communication unit transfer the information to the data processing device external to the motor vehicle and/or to the mobile terminal, and
 wherein the information provided by the communication unit of the control device is selected by the mobile terminal via at least one status protocol.

* * * * *